(12) United States Patent
McIntosh

(10) Patent No.: US 12,092,550 B2
(45) Date of Patent: Sep. 17, 2024

(54) WATER LEAK DETECTION SYSTEMS AND METHODS FOR AN INTERNAL CABIN OF AN AIRCRAFT

(71) Applicant: THE BOEING COMPANY, Arlington, VA (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/520,909

(22) Filed: Nov. 28, 2023

(65) Prior Publication Data

US 2024/0102881 A1 Mar. 28, 2024

Related U.S. Application Data

(63) Continuation of application No. 17/684,467, filed on Mar. 2, 2022, now Pat. No. 11,898,939.

(Continued)

(51) Int. Cl.
*G01M 3/26* (2006.01)
*B64D 45/00* (2006.01)
(Continued)

(52) U.S. Cl.
CPC ............. *G01M 3/26* (2013.01); *B64D 45/00* (2013.01); *B64D 47/02* (2013.01); *B64F 5/60* (2017.01)

(58) Field of Classification Search
CPC . G01M 3/26; B64F 5/60; B64D 45/00; B64D 47/02
See application file for complete search history.

(56) References Cited

U.S. PATENT DOCUMENTS

2009/0083906 A1* 4/2009 Kurita ................ G05D 23/1393
4/619
2010/0125941 A1* 5/2010 Shin .......................... E03D 9/08
4/443

(Continued)

FOREIGN PATENT DOCUMENTS

JP 2003311135 A * 11/2003 ......... G05D 23/1393
WO WO-2020059661 A1 * 3/2020 ............. B64D 11/02

*Primary Examiner* — Jamel E Williams
(74) *Attorney, Agent, or Firm* — Joseph M. Butscher; The Small Patent Law Group LLC

(57) ABSTRACT

A vehicle includes an internal cabin. One or more areas are within the internal cabin. The one or more areas include one or more water-drawing components. A water supply system is within the internal cabin. The water supply system is configured to provide water to the one or more water-drawing components. A water leak detection system includes one or more sensing devices configured to detect water flow from the water supply system to the one or more water-drawing components. One or more shut-off valves are disposed on or within the water supply system. A control unit is in communication with the one or more sensing devices, the one or more shut-off valves, and the one or more water-drawing components. The control unit is configured to operate the one or more shut-off valves to stop the supply of water to the one or more water-drawing components in response to the one or more sensing devices detecting the water flow when the one or more water-drawing components are not in use.

20 Claims, 11 Drawing Sheets

Related U.S. Application Data

(60) Provisional application No. 63/212,137, filed on Jun. 18, 2021.

(51) Int. Cl.
*B64D 47/02* (2006.01)
*B64F 5/60* (2017.01)

(56) References Cited

U.S. PATENT DOCUMENTS

| | | | |
|---|---|---|---|
| 2010/0235978 A1* | 9/2010 | Guttau | B64D 11/02 |
| | | | 4/420.4 |
| 2018/0238765 A1* | 8/2018 | Gramespacher | G01M 3/2815 |
| 2022/0073206 A1* | 3/2022 | Murayama | F24H 15/174 |

* cited by examiner

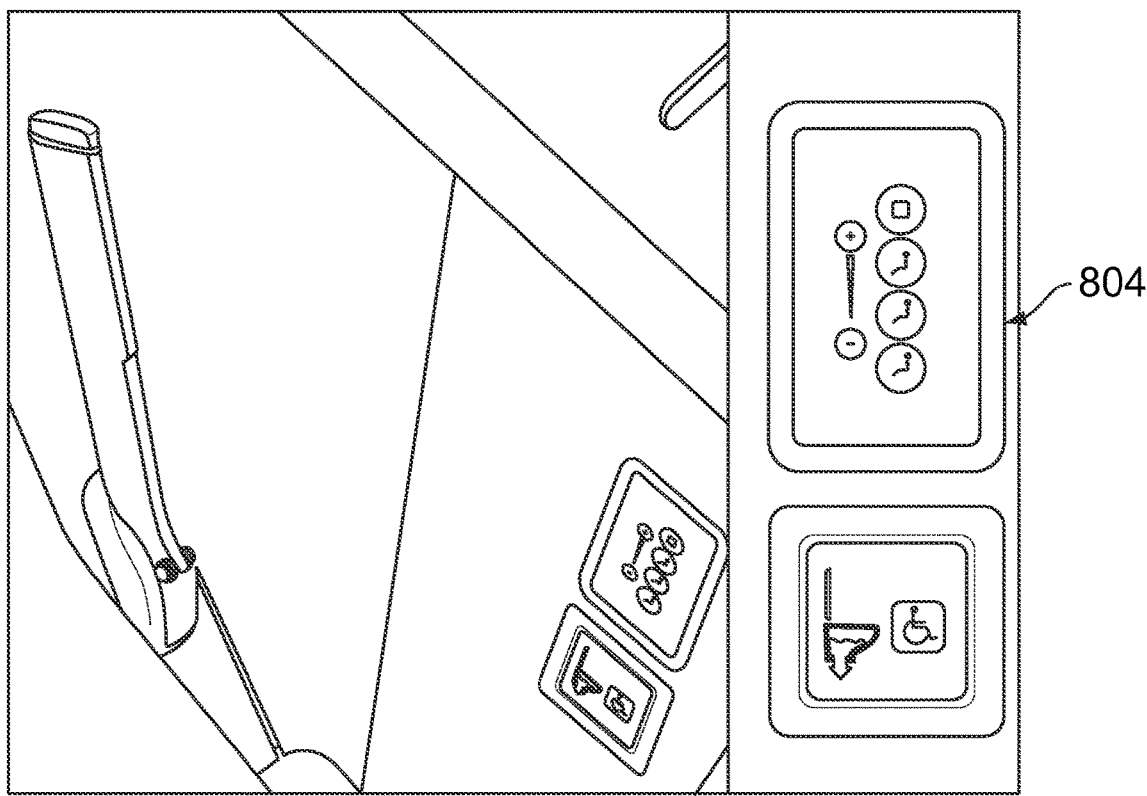
FIG. 12
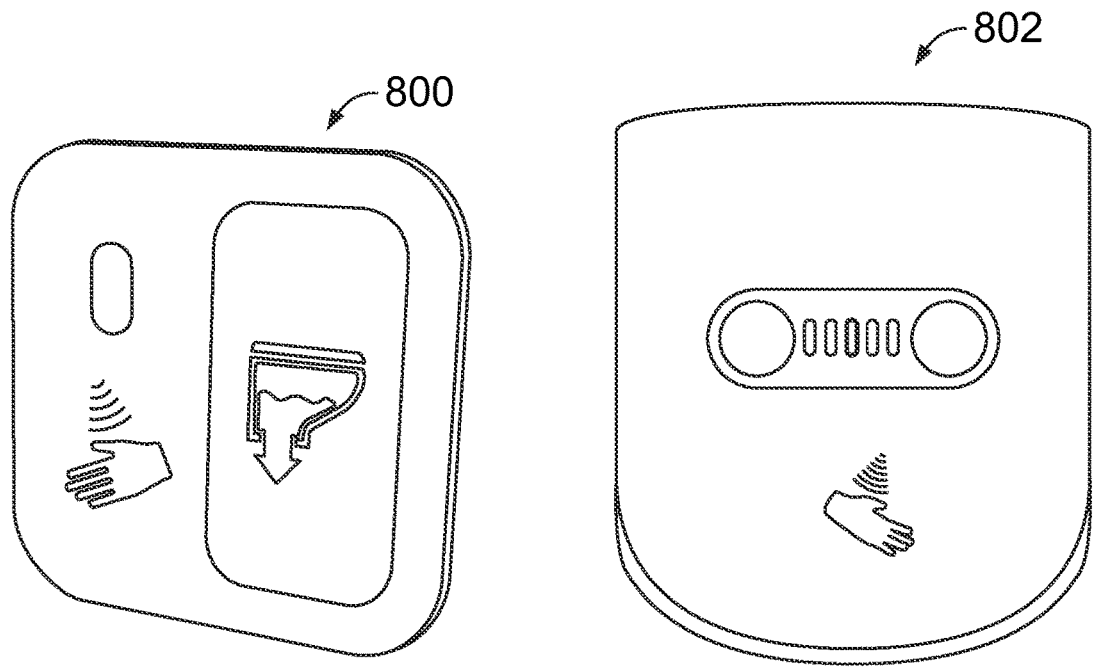
FIG. 10  FIG. 11

WATER LEAK DETECTION SYSTEMS AND METHODS FOR AN INTERNAL CABIN OF AN AIRCRAFT

CROSS-REFERENCE TO RELATED APPLICATIONS

This application is a continuation of U.S. patent application Ser. No. 17/684,467, filed Mar. 2, 2022, now U.S. Pat. No. 11,898,939, which, in turn, relates to and claims priority benefits from U.S. Provisional Patent Application No. 63/212,137, filed Jun. 18, 2021, each of which is hereby incorporated by reference in its entirety.

FIELD OF THE DISCLOSURE

Examples of the present disclosure generally relate to water leak detection systems and methods, such as for lavatories and galleys within an internal cabin of a commercial aircraft.

BACKGROUND OF THE DISCLOSURE

Commercial aircraft are used to transport passengers between various locations. A typical commercial aircraft includes one or more lavatories and one or more galleys within an internal cabin.

Water supply systems provide water to the lavatories and the galleys within internal cabins, such as through various conduits, tubes, pipes, and/or the like. As can be appreciated, a water leak onboard an aircraft can poses various safety issues. There are multiple areas throughout an airplane, such as within a lavatory, where a leak can occur.

SUMMARY OF THE DISCLOSURE

A need exists for a system and method for effectively detecting water leaks within an internal cabin of an aircraft, such as in relation to a lavatory, galley, or the like within the internal cabin.

With that need in mind, certain examples of the present disclosure provide a vehicle including an internal cabin. One or more areas are within the internal cabin. The one or more areas include one or more water-drawing components. A water supply system is within the internal cabin. The water supply system is configured to provide water to the one or more water-drawing components. A water leak detection system includes one or more sensing devices configured to detect water flow from the water supply system to the one or more water-drawing components. One or more shut-off valves are disposed on or within the water supply system. A control unit is in communication with the one or more sensing devices, the one or more shut-off valves, and the one or more water-drawing components. The control unit is configured to operate the one or more shut-off valves to stop the supply of water to the one or more water-drawing components in response to the one or more sensing devices detecting the water flow when the one or more water-drawing components are not in use.

In at least one example, the vehicle is an aircraft. In at least one example, the one or more areas include one or both of a lavatory or a galley. In at least one example, the water-drawing components comprises one or more of a faucet, a drinking fountain, a shower, a toilet, or a bidet. In at least one example, the one or more shut-off valves include one or more electromechanical solenoid shut-off valves.

In at least one example, the water supply system includes a water tank in fluid communication with a main water supply line. The main water supply line is in fluid communication with the one or more water-drawing components. In at least one further example, the one or more sensing devices include a first sensing device configured to detect the water flow proximate to the water tank, and the one or more shut-off valves include a first shut-off valve proximate to the water tank. In at least one further example, the one or more sensing devices further include one or more second sensing devices configured to detect the water flow proximate to the one or more water-drawing components, and the one or more shut-off valves include one or more second shut-off valves proximate to the one or more water-drawing components.

In at least one example, the one or more sensing devices are configured to detect the water flow proximate to the one or more water-drawing components. The one or more shut-off valves are proximate to the one or more water-drawing components.

In at least one example, a display is in communication with the control unit. The control unit is configured to show status indications on the display. As a further example, the display includes a status light. The control unit is in communication with the status light. As a further example, the status light is on an exterior of a lavatory.

In at least one example, the water leak detection system further comprises a user interface in communication with the control unit, and wherein the user interface is configured to be engaged to run a diagnostic test for water leaks.

Certain examples of the present disclosure provide a method of detecting a water leak within a vehicle. The method includes communicatively coupling a control unit with one or more sensing devices configured to detect water flow from a water supply system to one or more water-drawing components within one or more areas of the vehicle; communicatively coupling the control unit with one or more shut-off valves disposed on or within the water supply system; communicatively coupling the control unit with the one or more water-drawing components; and operating, by the control unit, the one or more shut-off valves to stop the supply of water to the one or more water-drawing components in response to the one or more sensing devices detecting the water flow when the one or more water-drawing components are not in use.

BRIEF DESCRIPTION OF THE DRAWINGS

FIG. 10 illustrates an interface for a vacuum toilet flush module, according to an example of the present disclosure.

FIG. 11 illustrates an interface for a faucet control module, according to an example of the present disclosure.

FIG. 12 illustrates an interface for a bidet control module, according to an example of the present disclosure.

DETAILED DESCRIPTION OF THE DISCLOSURE

Figure 1:
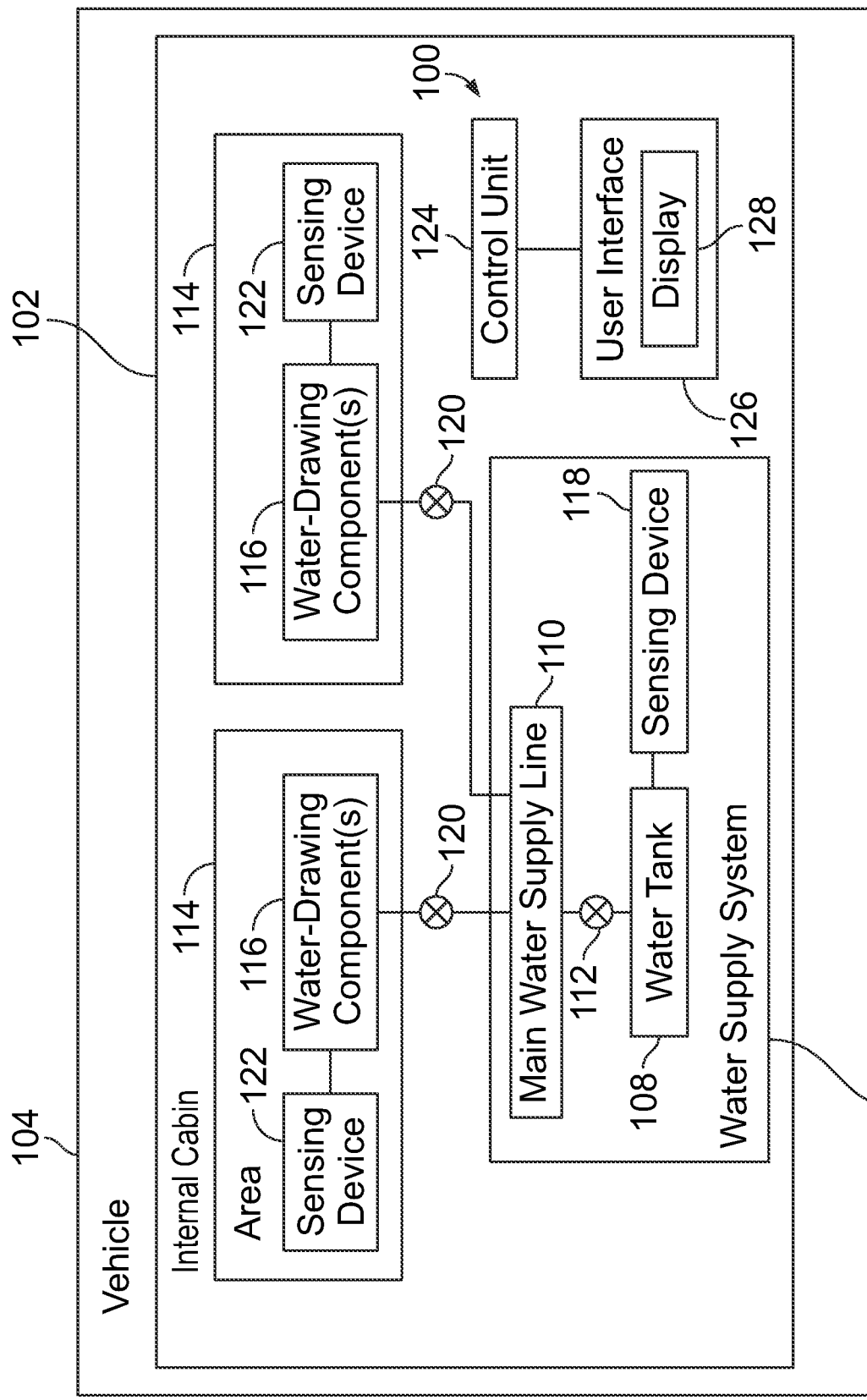
FIG. 1 illustrates a schematic block diagram of a water leak detection system within an internal cabin of a vehicle, according to example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a water leak detection system and method that is configured to operate in various areas within an internal cabin, such as a lavatory, galley, or the like. The water leak detection system and method can be disposed within an existing water supply system, such that all water that enters an area travels through the water leak detection system. In an example, if water flow is detected when a faucet control module and/or vacuum toilet flush/rinse are in use, no action is taken. If water flow is detected when the faucet and toilet are not in use, the water leak detection system indicates a water leak and the system shuts off water to the lavatory and sends a signal to the exterior lavatory status light, which, in response, flashes or otherwise illuminates (such as via an amber illumination and/or flashing) to indicate a detected water leak.

Certain examples of the present disclosure provide a vehicle including an internal cabin having one or more areas, such as lavatories, galleys, and the like. The areas include one or more water-drawing components. For example, the lavatory includes one or more water-drawing components. A water supply system is within the internal cabin. The water supply system is configured to provide water to the areas. A water leak detection system includes one or more sensing devices configured to detect water flow from the water supply system to the one or more water-drawing components. One or more shut-off valves are disposed on or within the water supply system. A control unit is in communication with the one or more sensing devices, the one or more shut-off valves, and the one or more water-drawing components. The control unit is configured to operate the shut-off valve to stop the supply of water to the one or more water-drawing components in response to the one or more sensing devices detecting the water flow and the one or more water-drawing components not being in use.

In at least one example, the vehicle is an aircraft. As an example, the water-drawing components include one or more of a faucet, a drinking fountain, a toilet, a bidet, and/or the like. In at least one example, the one or more sensing devices include one or both of a sensor or a meter disposed on or within the water supply system. In at least one example, the shut-off valve is an electromechanical solenoid shut-off valve.

In at least one example, the control unit is in communication with a status light. The control unit is further configured to output an alert signal to the status light. As an example, the status light is on an exterior of the lavatory.

FIG. 1 illustrates a schematic block diagram of a water leak detection system 100 within an internal cabin 102 of a vehicle 104, according to example of the present disclosure. The water leak detection system 100 includes a water supply system 106 that has a water tank 108 that retains a supply of water. The water tank 108 is in fluid communication with a main water supply line 110. In at least one example, a shut-off valve 112 is disposed on and/or within the main water supply line 110 proximate to the water tank 108. For example, the shut-off valve 112 is disposed between the water tank 108 and areas 114 within the internal cabin 102 that include water-drawing components 116. A sensing device 118 is in fluid communication with the water tank 108 and is configured to detect flow of water out of the water tank 108.

The main water supply line 110 fluidly connects the water-drawing components 116 of the areas 114 with the water supply system 106. As such, the water-drawing components 116 are configured to receive water from the water tank 108 via the main water supply line 110. Shut-off valves 120 are disposed in conduits that connect the water-drawing components 116 to the main water supply line 110. Sensing devices 122 are in fluid communication with the water-drawing components 116 and are configured to detect flow of water to and/or from the water-drawing components 116.

The internal cabin 102 can include one or more areas 114. The internal cabin 102 can include numerous areas 114. Examples of the areas 114 include a lavatory, a galley, a monument (such as closet), and/or the like. Examples of the water-drawing components 116 include a faucet, a drinking fountain, a shower, a toilet, a bidet, and/or the like. Each area 114 can include one or more water-drawing components 116. Each water-drawing component 116 can be coupled to a separate sensing device 122 and a separate shut-off valve 120.

The water leak detection system 100 further includes a control unit 124 in communication with the shut-off valve 112, the sensing device 118, the shut-off valves 120, and the sensing devices 122, such as through one or more wired or wireless connections. For example, the control unit 124 can be in communication with any of the shut-off valve 112, the sensing device 118, the shut-off valves 120, and/or the sensing devices 122 through hard wiring, wireless communication devices such as antennas, Wi-Fi receivers and transmitters, Bluetooth devices, and/or the like. In at least one example, the control unit 124 is also in communication with a user interface 126 within the internal cabin 102, such as through one or more wired or wireless connections. The user interface 126 includes a display 128, such as a monitor, electronic screen, television, one or more lights, a light emitting diode (LED) panel or screen, and/or the like. The display 128 is in communication with the control unit 124. The control unit 124 is configured to show status indications on the display 128.

In operation, the control unit 124 receives signals from the sensing device 118 and the sensing devices 122 regarding flow of water. For example, the control unit 124 receives signals from the sensing device 118 that indicate that water is, or is not flowing from the water tank 108 into the main water supply line 110. Similarly, the control unit 124 receives signals from the sensing devices 122 that indicate that water is, or is not flowing from the main water supply line 110 to the water-drawing components 116.

The water supply system 106 is configured to provide water to the water-drawing components 116 within the areas 114 of the internal cabin 102. The areas 114 can be lavatories, galleys, monuments, such as closets, and/or the like. The sensing device 118 is configured to detect water flow from the water tank 108 into the main water supply line 110. The sensing devices 122 are configured to detect water flow from the main water supply line 110 of the water supply system 106 to the water-drawing components 116. The shut-off valve 112 is disposed on or within the water supply system 106 between the water tank 108 and the main water supply line 110. The shut-off valves 120 are disposed on or within the water supply system 106 between the main water supply line 110 and the water-drawing components 116.

In at least one example, the control unit 124 is in communication with the sensing device 118, the sensing devices 122, the shut-off valve 112, the shut-off valves 120, the one or more water-drawing components 116, and the water tank 108, such as through one or more wired or wireless connections. The control unit 124 is configured to operate the shut-off valve 112 to stop the supply of water from the water tank 108, and/or to operate the shut-off valves 120 in response to the sensing device 118 and/or the sensing devices 122 detecting water flow within the water supply system 106 and also detecting that the one or more water-drawing components 116 are not in use.

Examples of the sensing devices 118 and 122 include sensors, meters, and/or the like. The sensing devices 118 and 122 can be disposed on and/or within the water supply system 106 that supplies water to the water-drawing components 116 throughout the internal cabin 102. The water supply system 106 includes one or more conduits, tubes, pipes, valves, and/or the like that are configured to provide water to the water-drawing components 116.

The shut-off valves 112 and 120 can be various types of valves, such as electromechanical solenoid valves. For example, each of the shut-off valves 112 and 120 can be an electromechanical solenoid valve.

The control unit 124 can provide various status indications on the display 128. For example, the control unit 124 can provide a visual message on the display 128 regarding a leak within the water supply system 106.

In at least one example, the control unit 124 is further in communication with one or more water-drawing components 116 of a lavatory 200, such as one or more of a faucet control module, a drinking fountain control module, a shower control module, a vacuum toilet flush control module, a bidet control module, and/or the like. The control unit 124 receives signals from such control modules to determine when the water-drawing components 116 are in use. For example, when an individual operates a faucet to draw water therefrom, the control unit 124 receives one or more signals from such component indicating that the faucet is in use.

In operation, the water leak detection system 100 monitors water flow into the various areas 114, such as via the one or more sensing devices 122. The control unit 124 is further in communication with one or more water-drawing components 116 within the areas 114, as noted. In particular, the control unit 124 receives signals from such components that indicate associated features are in use. When the features, such as a drinking fountain, shower, toilet flush, faucet, and/or bidet are in use, the control unit 124 takes no further action. That is, the control unit 124 takes no action such that water is supplied to such features when in use. If, however, such features are not in use, but water flow is detected by the sensing device(s) 118, and/or the sensing devices 122, the control unit 124 operates the shut-off valve 112 and/or the 120, such as via outputting a control signal, to shut off or otherwise stop flow of water to the water-drawing components 116 (and/or to the areas 114, such as at a point where water is supplied to all of the water-drawing components 116 of the areas 114), thus preventing any water leak.

The control unit 124 can also output an alert signal to the display 128, such as a status light, which may, in response, emit an alert, such as a colored illumination, a flashing illumination, and/or the like, which indicates to individuals (such as flight attendants) that a water leak has been detected. In at least one example, the alert can be a flashing amber illumination.

The water leak detection system 100 can be designed for the unique requirements for airplane certification, such as with respect to flammability, pressure (air and water) differentials, temperature differentials, vibration, reliability and endurance, hard water, fail safe, and/or the like.

As noted, the water leak detection system 100 is configured for use within the areas 114 of the internal cabin 102 of the vehicle 104. The areas 114 includes lavatories, galleys, and/or various other areas that include water-drawing components 116. The vehicle 104 can be an aircraft. Optionally, the water detection system 100 can be used with various other vehicles, such as a land-based vehicle (such as a bus, train, or the like), a water-based vehicle (such as a passenger cruise ship), a spacecraft, or the like.

In at least one other example, the water leak detection system 100 includes the shut-off valve 112, but not the shut-off valves 120. In at least one other example, the water leak detection system 100 includes the shut-off valves 120, but not the shut-off valve 112.

As described herein, the vehicle 104 includes the internal cabin 102. One or more areas 114 are within the internal cabin 102. The one or more areas 114 include one or more water-drawing components 116. The water supply system 106 is within the internal cabin 102. The water supply system 106 is configured to provide water to the one or more water-drawing components 116. The water leak detection system 100 includes one or more sensing devices 118 and/or 122 configured to detect water flow from the water supply system 106 to the one or more water-drawing components 116. One or more shut-off valves 112 and/or 120 are disposed on or within the water supply system 106. The control unit 124 is in communication with the one or more sensing devices 118 and/or 122, the one or more shut-off valves 112 and/or 120, and the one or more water-drawing components 116. The control unit 124 is configured to operate the one or more shut-off valves 112 and/or 120 to stop the supply of water to the one or more water-drawing components 116 in response to the one or more sensing devices 118 and/or 122 detecting the water flow when the one or more water-drawing components 116 are not in use.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 124 can be or include one or more processors that are configured to control operation thereof, as described herein.

The control unit(s), such as the control unit 124, are configured to execute a set of instructions that are stored in one or more data storage units or elements (such as one or more memories), in order to process data. For example, the control unit 124 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit(s), such as the control unit 124, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the control unit 124. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the control unit 124, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
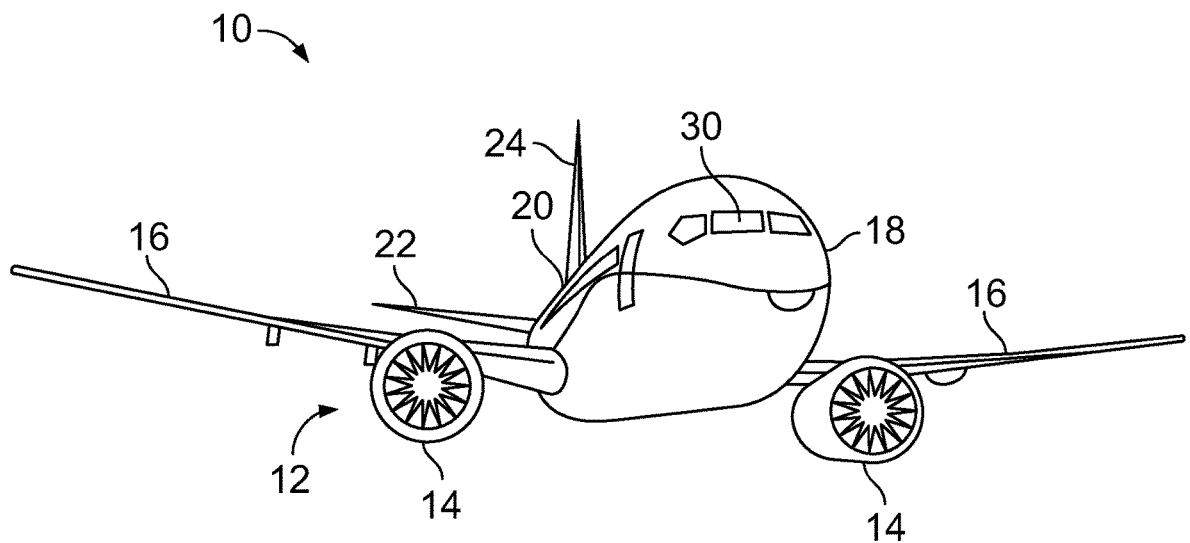
FIG. 2 illustrates a perspective front view of an aircraft, according to an example of the present disclosure.

FIG. 2 illustrates a perspective front view of an aircraft 10, according to an example of the present disclosure. The aircraft 10 is an example of the vehicle 104, shown in FIG. 1. The aircraft 10 includes a propulsion system 12 that includes engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 30 is an example of the internal cabin 102, shown in FIG. 1.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Figure 3:
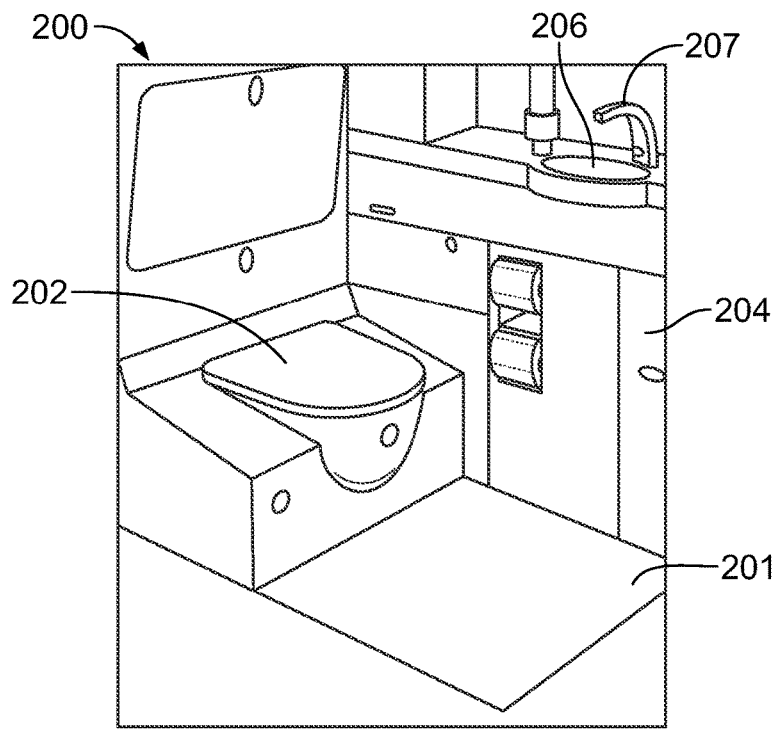
FIG. 3 illustrates an isometric internal view of a lavatory, according to an example of the present disclosure.

FIG. 3 illustrates an isometric internal view of a lavatory 200, according to an example of the present disclosure. The lavatory 200 is an example of an area 114, shown in FIG. 1. The lavatory 200 is an example of an enclosed space or chamber, such as within the internal cabin of the aircraft 10, shown in FIG. 2. The lavatory 200 may be onboard an aircraft. Optionally, the lavatory 200 may be onboard various other vehicles. In other examples, the lavatory 200 may be within a fixed structure, such as a commercial or residential building. The lavatory 200 includes a base floor 201 that supports a toilet 202, one or more cabinets 204, a sink 206 or wash basin, and a faucet 207. The lavatory 200 may be arranged differently than shown. The lavatory 200 may include more or less components than shown. The toilet 202 and the faucet 207 are examples of water-drawing components 116, shown in FIG. 1.

Figure 4:
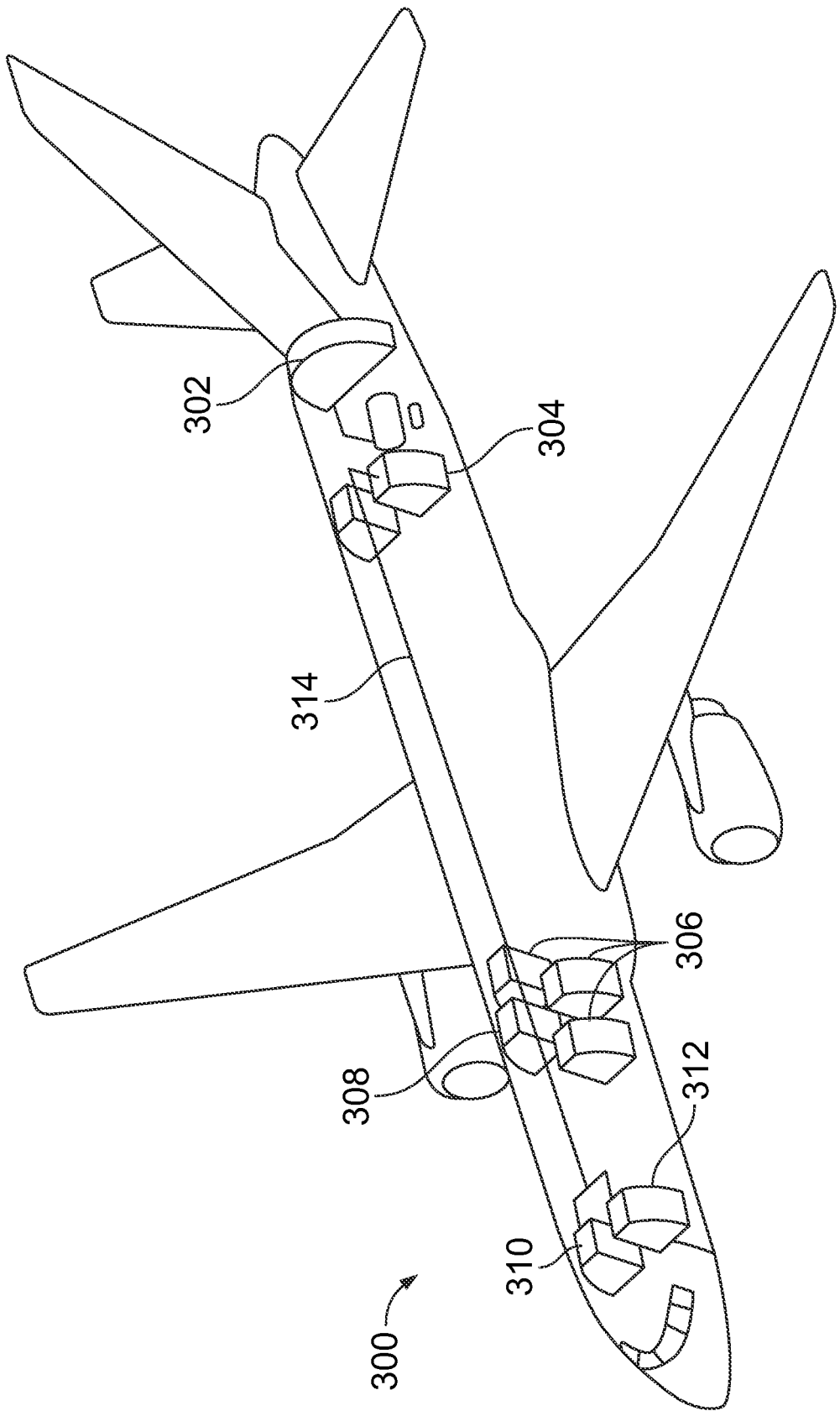
FIG. 4 illustrates an isometric top internal view of an aircraft, according to an example of the present disclosure.

FIG. 4 illustrates an isometric top internal view of an aircraft 300, according to an example of the present disclosure. The aircraft 300 is an example of a vehicle 104, shown in FIG. 1. The aircraft 300 includes numerous areas that include water-drawing components. For example, the aircraft 300 includes an aft galley 302, aft lavatories 304, mid galleys 306, a mid lavatory 308, a forward galley 310, and a forward lavatory 312, each of which is an area, such as an area 114 shown in FIG. 1, that includes one or more water-drawing components. A water distribution line 314 can be disposed underneath a floor of an internal cabin (or optionally above a ceiling or in other areas), and is configured to provide water to the various water-drawing components, as described herein. The water distribution line 314 is an example of the main water supply line 110 shown in FIG. 1.

Figure 5:
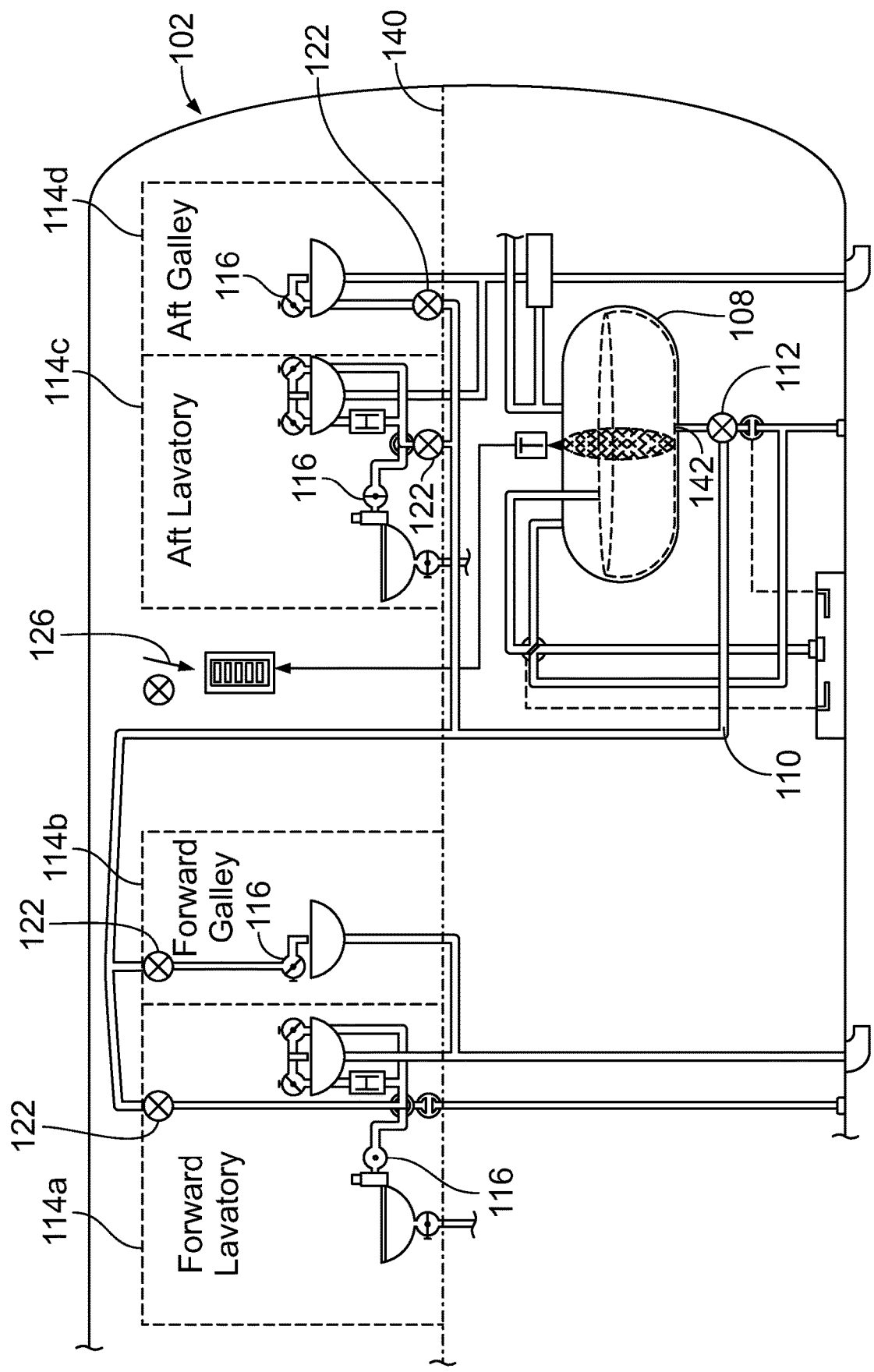
FIG. 5 illustrates a schematic internal view of a portion of an internal cabin, according to an example of the present disclosure.

FIG. 5 illustrates a schematic internal view of a portion of an internal cabin 102, according to an example of the present disclosure. As shown, the water tank 108 can be disposed underneath a floor 140. The internal cabin 102 includes various areas, such as a forward lavatory 114a, a forward galley 114b, an aft lavatory 114c, and an aft galley 114d. The shut-off valve 112 is disposed in the main water supply line 110 proximate to an outlet 142 of the water tank 108. The shut-off valves 120 are disposed in the main water supply line 110, and/or conduits connected to the main water supply line 110, proximate to the water drawing-components 116, such as at or proximate to water outlets of the water drawing-components 116. The user interface 126 is disposed within the internal cabin 102, such as within an attendant work station.

Figure 6:
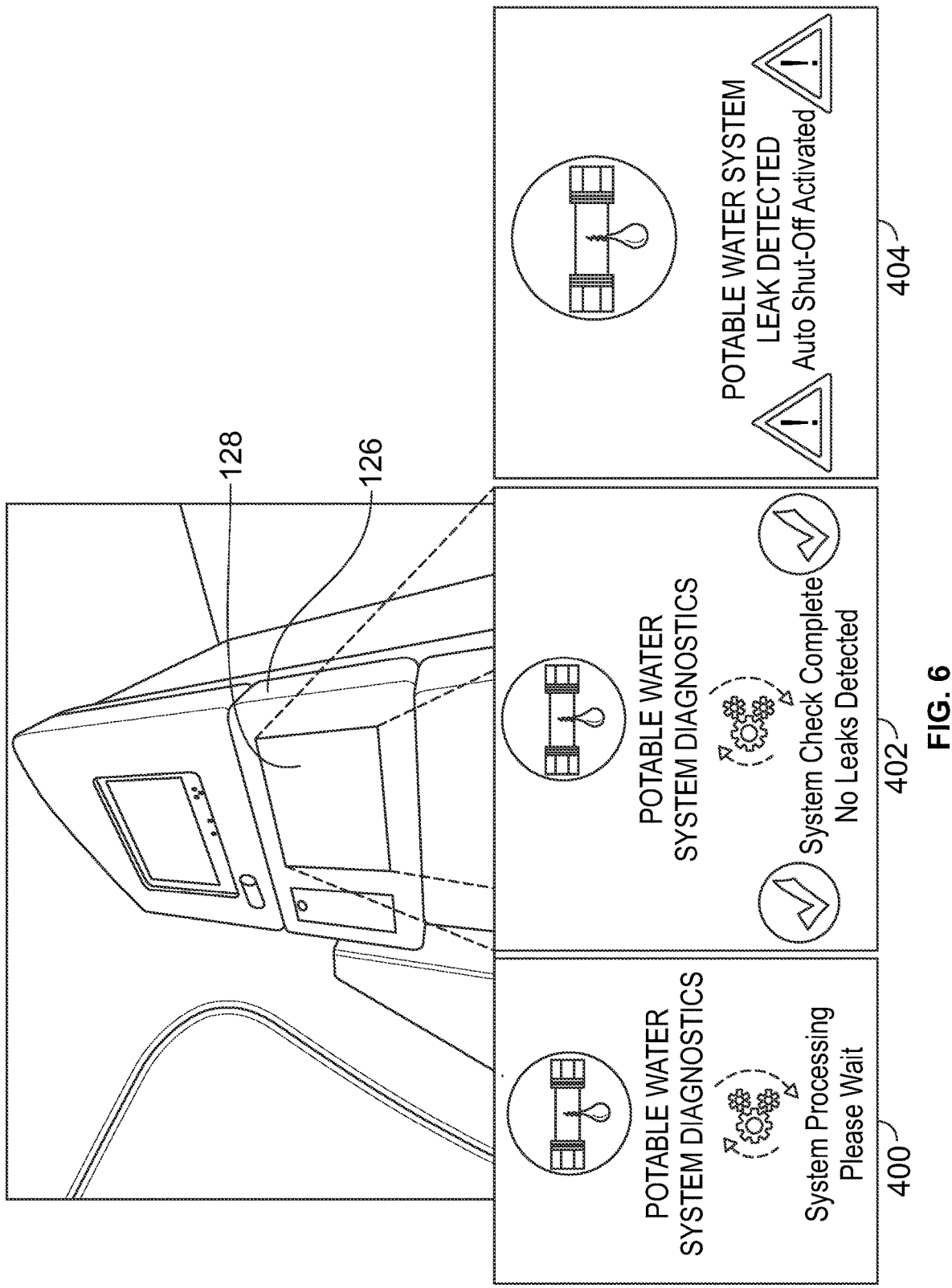
FIG. 6 illustrates a perspective front view of a user interface, according to an example of the present disclosure.

FIG. 6 illustrates a perspective front view of a user interface 126, according to an example of the present disclosure. The user interface 126 includes the display 128, which can be an electronic monitor, screen, television, or the like. Referring to FIGS. 1 and 6, the control unit 124 is in communication with the user interface 126 and is configured to show various messages, such as status indications, on the display 128. For example, the control unit 124 can show, on the display 128 a diagnostic graphic 400, a normal operation graphic 402 (indicating no leaks), and a leak warning graphic 404.

Referring again to FIG. 1, the sensing device 118 monitors water flow from the water tank 108. If the control unit 124 detects water flowing from the water tank 108 and that a water-drawing component 116 is in use (such that water is to flow to and/or from the water-drawing component 116), then the control unit 124 allows the water flow (for example, does not close the shut-off valve(s)). If, however, the control unit 124 detects, via the sensing device 118, water flow in relation to the water tank 108 (for example, water flowing from the water tank 108), but water flow confirmation is not received from the water-drawing components 116 (such as via associated control modules), then the control unit 124 operates the shut-off valve 112 to stop water flowing from the water tank 108. The control unit 124 can then provide an alert on the display 128 indicating the existence of a water leak.

In at least one example, the control unit 124 monitors water flow via the sensing devices 118 and/or 122. A maintenance feature can be shown on the display 128. At any time, an individual can engage the user interface 126, such as via a touchscreen interface, a keypad, or the like, to run a diagnostic test for water leaks. For example, the diagnostic test can be performed between flights of an aircraft, when there is nobody on the airplane and no water is in use. The diagnostic test can also be performed remotely, for example an offsite aircraft maintenance facility hub can monitor aircraft status for a single aircraft, or a fleet of aircraft, via the internet, or mobile connectivity. Such capability can be part of a connected cabin and the Internet of Things (IoT) with airplane to ground based fleet operations. With this capability, maintenance crews are alerted to the issue (leak) and can be at the ready to address and/or repair the issue as soon as possible.

Figure 7:
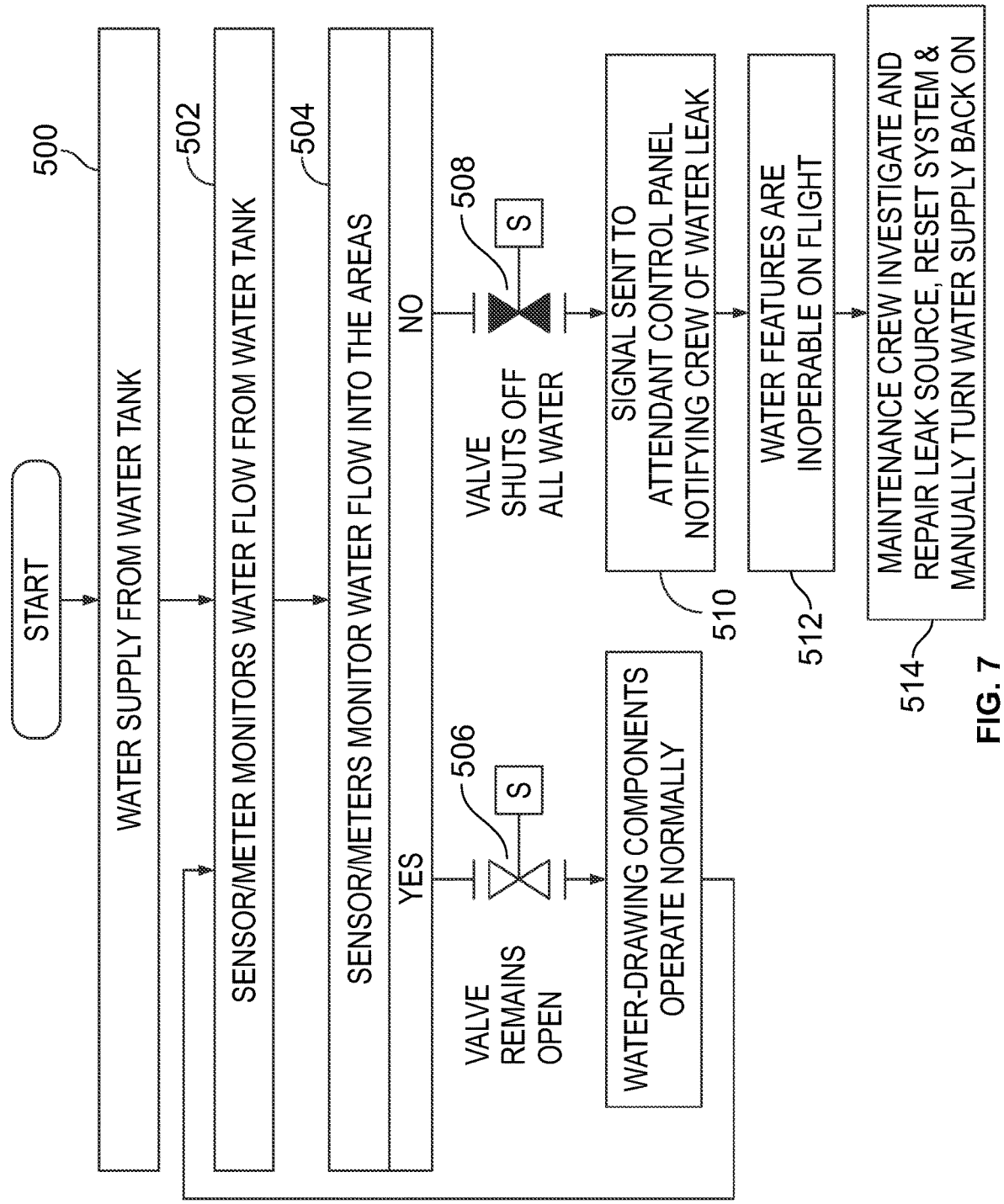
FIG. 7 illustrates a flow chart of a water leak detection method, according to an example of the present disclosure.

FIG. 7 illustrates a flow chart of a water leak detection method, according to an example of the present disclosure. Referring to FIGS. 1 and 7, at 500, the water tank 108 provides water, such as to the main water supply line 110. At 502, the sensing device 118 monitors water flow from the water tank 108. In particular, the sensing device 118 outputs sensing signals indicative of water flow to the control unit 124. At 504, the sensing devices 122 monitor water flow into the areas 114, such as into the water-drawing components 116. The sensing devices 122 output signals indicative of water flow to the control unit 124.

At 506, if the control unit 124, based on the signals received from the sensing devices 122, determines that the water-drawing components 116 are in use, then the control unit 124 does not interrupt water flow. Instead, the water-drawing components 116 operate normally, and the method returns to 502.

If, however, the control unit 124 determines that the water-drawing components 116 are not in use, but detects water flow to the water-drawing components 116, the control unit 124 at 508 operates the shut-off valve 112 to close, thereby stopping water flow from the water tank 108. The control unit 124 can further output an alert signal at 510, such as to the user interface 126, indicative of a water leak. By closing the shut-off valve 112 at 508, the water-drawing components 116 are inoperable at 512, thereby requiring maintenance at 514.

Figure 8:
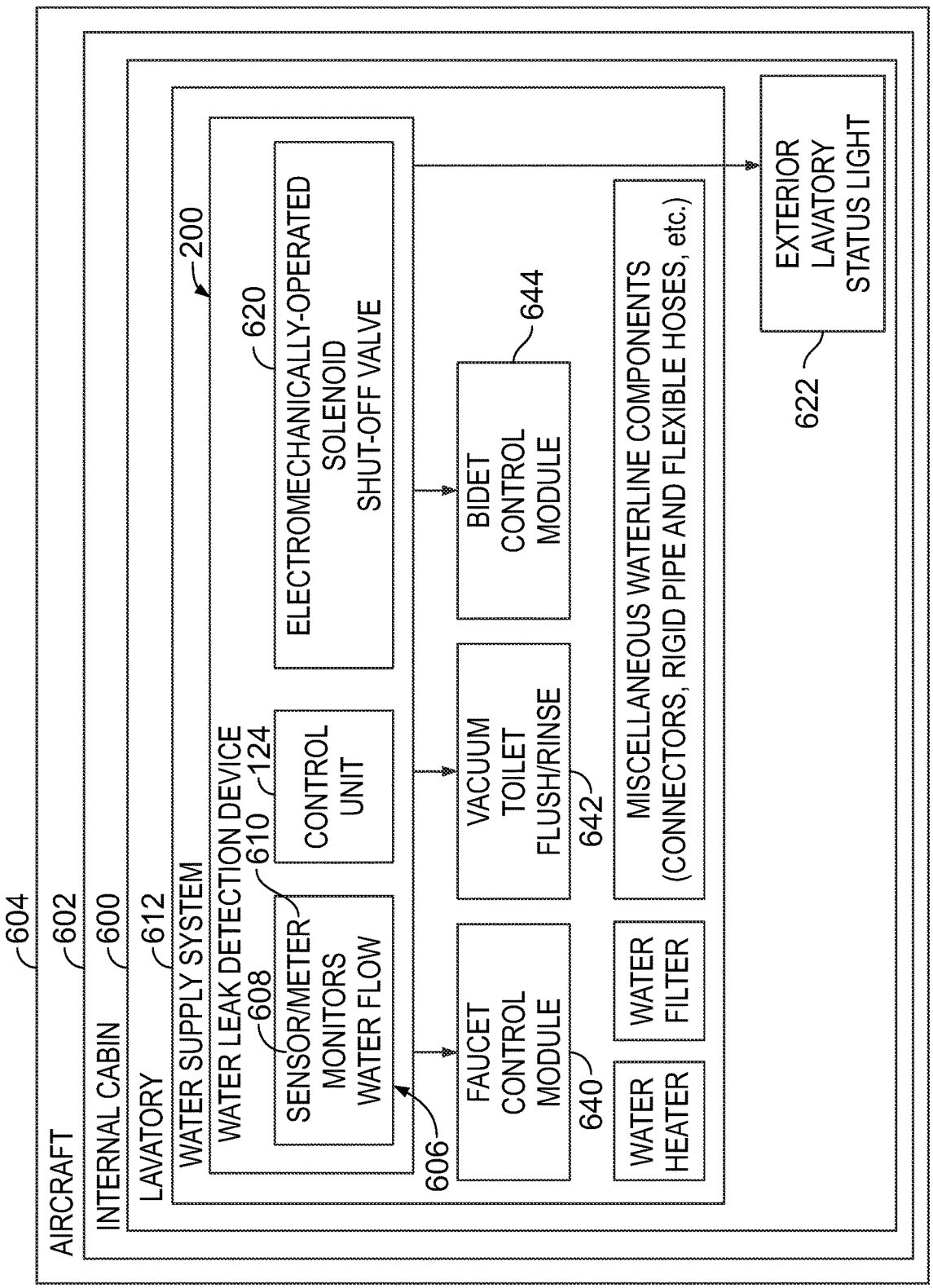
FIG. 8 illustrates a schematic block diagram of a water leak detection system for a lavatory within an internal cabin of an aircraft, according to an example of the present disclosure.

FIG. 8 illustrates a schematic block diagram of a water leak detection system 100 for a lavatory 600 within an internal cabin 602 of an aircraft 604, according to an example of the present disclosure. The water leak detection system 100 includes one or more sensing devices 606, such as a sensor 608 and/or a meter 610, disposed on and/or within a water supply system 612 that supplies water to the lavatory 600. The water supply system 612 includes one or more conduits, tubes, pipes, valves, and/or the like that are configured to provide water to components within the lavatory 600, such as a faucet and toilet. The water leak detection system 100 also includes a control unit 124 in communication with the sensor 608 and/or meter 610, such as through one or more wired or wireless connections.

The control unit 124 is further in communication with a shut-off valve 620 disposed on and/or within the water supply system 612. As an example, the shut-off valve 620 is an electromechanical solenoid valve.

The control unit 124 can also be in communication with an exterior status light 622 of the lavatory 600, such as through one or more wired or wireless connections. The exterior status light 622 is an example of a display 128, shown in FIG. 1. The control unit 124 is further in communication with one or more water-drawing components of the lavatory 600, such as one or more of a faucet control module 640, a vacuum toilet flush module 642, and/or a bidet control module 644.

In operation, the water leak detection system 100 monitors water flow into the lavatory 600, such as via the one or more sensing devices 606. The control unit 124 is further in communication with one or more water-drawing components within the lavatory 600, such as the faucet control module 640, the vacuum toilet flush module 642, and/or the bidet control module 644. In particular, the control unit 124 receives signals from such components that indicate associated features are in use. When the features, such as toilet flush, faucet, and/or bidet are in use, the control unit 124 takes no further action. That is, the control unit 124 takes no action such that water is supplied to such features when in use. If, however, such features are not in use, but water flow is detected by the sensing device(s) 606, the control unit 124 operates the shut-off valve 620, such as via outputting a control signal, to shut off or otherwise stop flow of water to the water-drawing components (and/or to the lavatory 600, such as at a point where water is supplied to all of the water-drawing components of the lavatory 600), thus preventing any water leak.

The control unit 124 can also output an alert signal to the status light 622, which may, in response, emit an alert, such as a colored illumination, a flashing illumination, and/or the like, which indicates to individuals (such as flight attendants) that a water leak has been detected. In at least one example, the alert can be a flashing amber illumination.

The water leak detection system 100 can be designed for the unique requirements for airplane certification, such as with respect to flammability, pressure (air and water) differentials, temperature differentials, vibration, reliability and endurance, hard water, fail safe, and/or the like.

As noted, the water detection system 100 is configured for use within the lavatory 600 of an internal cabin 602 of an aircraft. Optionally, the water detection system 100 can be used with various other vehicles, such as a land-based vehicle (such as a bus, train, or the like), a water-based vehicle (such as a passenger cruise ship), a spacecraft, or the like.

The water leak detection system 100 can include sensing devices proximate to the water-drawing components. Optionally, the water leak detection system 100 can also include sensing devices and a shut-off valve proximate to a water tank, as described above with respect to FIG. 1, for example.

Figure 9:
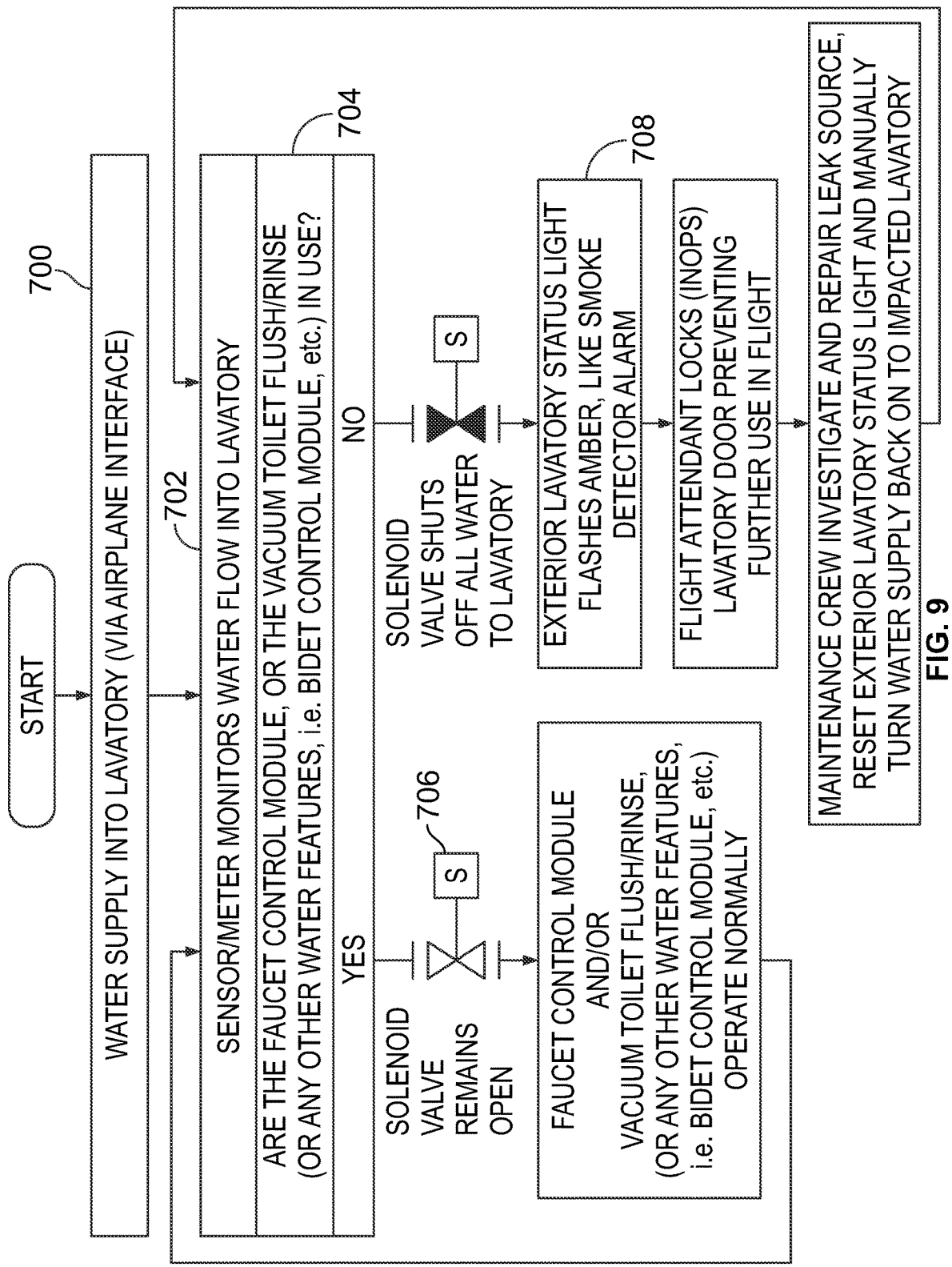
FIG. 9 illustrates a flow chart of a water leak detection method, according to an example of the present disclosure.

FIG. 9 illustrates a flow chart of a water leak detection method, according to an example of the present disclosure. Referring to FIGS. 8 and 9, at 700, water is supplied to the lavatory 600. At 702, the sensing devices 606 monitor water flow in the lavatory 600.

At 704, the control unit 124 detects if water-drawing components of the lavatory 600 are in use. If yes, the shut-off valve 620 remains open at 706, and the control unit 124 takes no further action.

If, however, such water-drawing components are not in use, but the sensing devices 606 detect water flow at 704, the control unit 124 operates the shut-off valve 620 to stop the flow of water into the lavatory. The exterior status light 622 flashes the alert at 708, thereby alerting flight crew of the leak.

FIG. 10 illustrates an interface 800 for a vacuum toilet flush module. FIG. 11 illustrates an interface 802 for a faucet control module. FIG. 12 illustrates an interface 804 for a bidet control module. Referring to FIGS. 1-12, the systems and methods may or may not include defined interfaces, such as shown. Further, the systems and methods may not include a bidet control module or a bidet, for example. FIGS. 10-12 illustrate examples of interfaces for certain exemplary water-drawing components. Various other types of water-drawing components can be used.

Figures 13, 14:
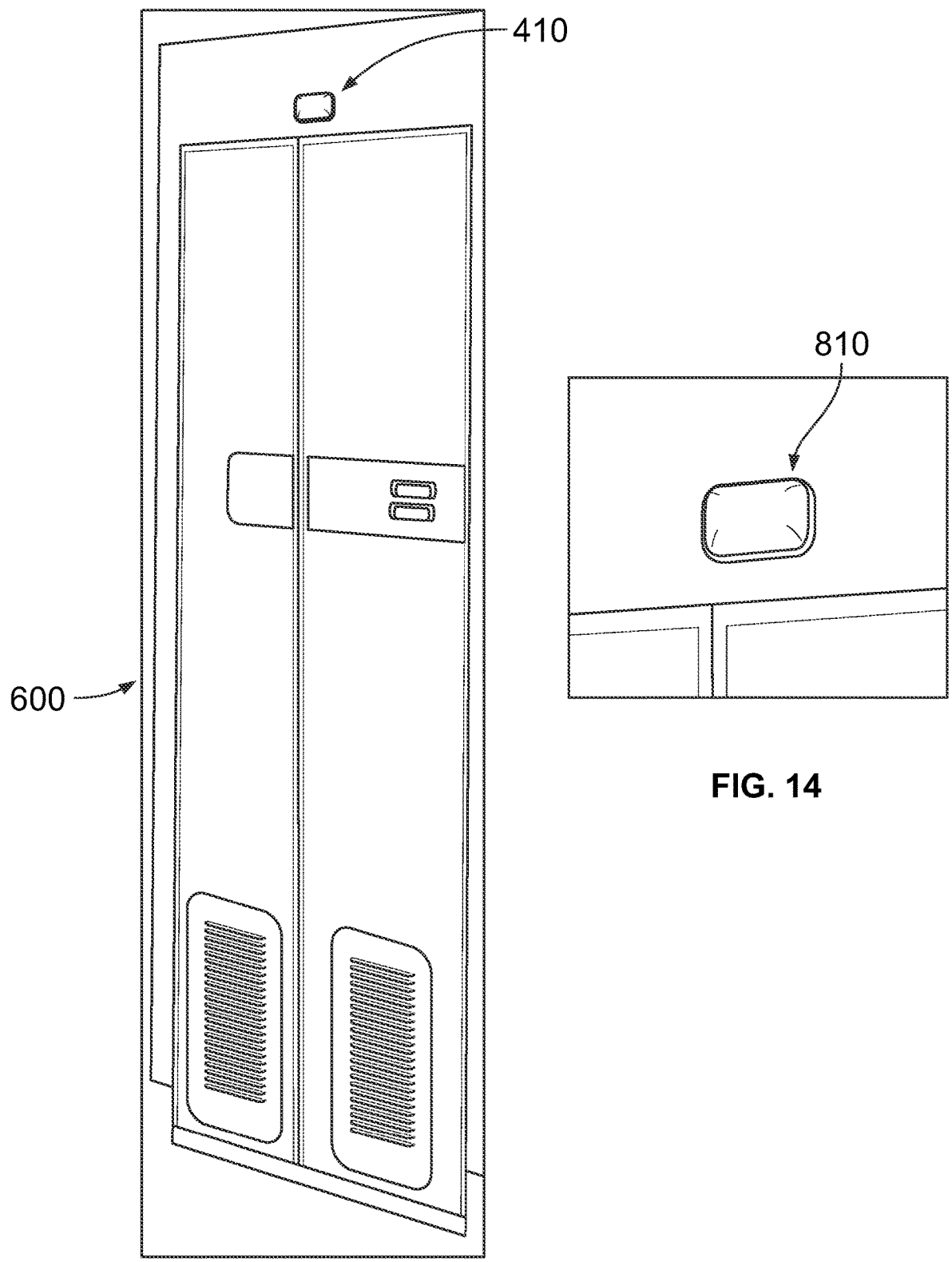
FIG. 13 illustrates an exterior of a lavatory, according to an example of the present disclosure.
FIG. 14 illustrates a status light of a lavatory, according to an example of the present disclosure.

FIG. 13 illustrates an exterior of a lavatory 600. FIG. 14 illustrates a status light 810 of the lavatory 600. The status light 810 is an example of the status light 622 shown in FIG. 8. As shown, the status light 810 can be above an entrance of the lavatory 600. Optionally, the status light 810 can be at various other areas of the internal cabin. Alternatively, the systems and methods may not include status lights. Instead, the control unit 124 can be in communication with user interfaces, such as computer workstations, handheld devices (such as smart phones), and/or the like, which can indicate water leak alerts communicated from the control unit.

Figure 15:
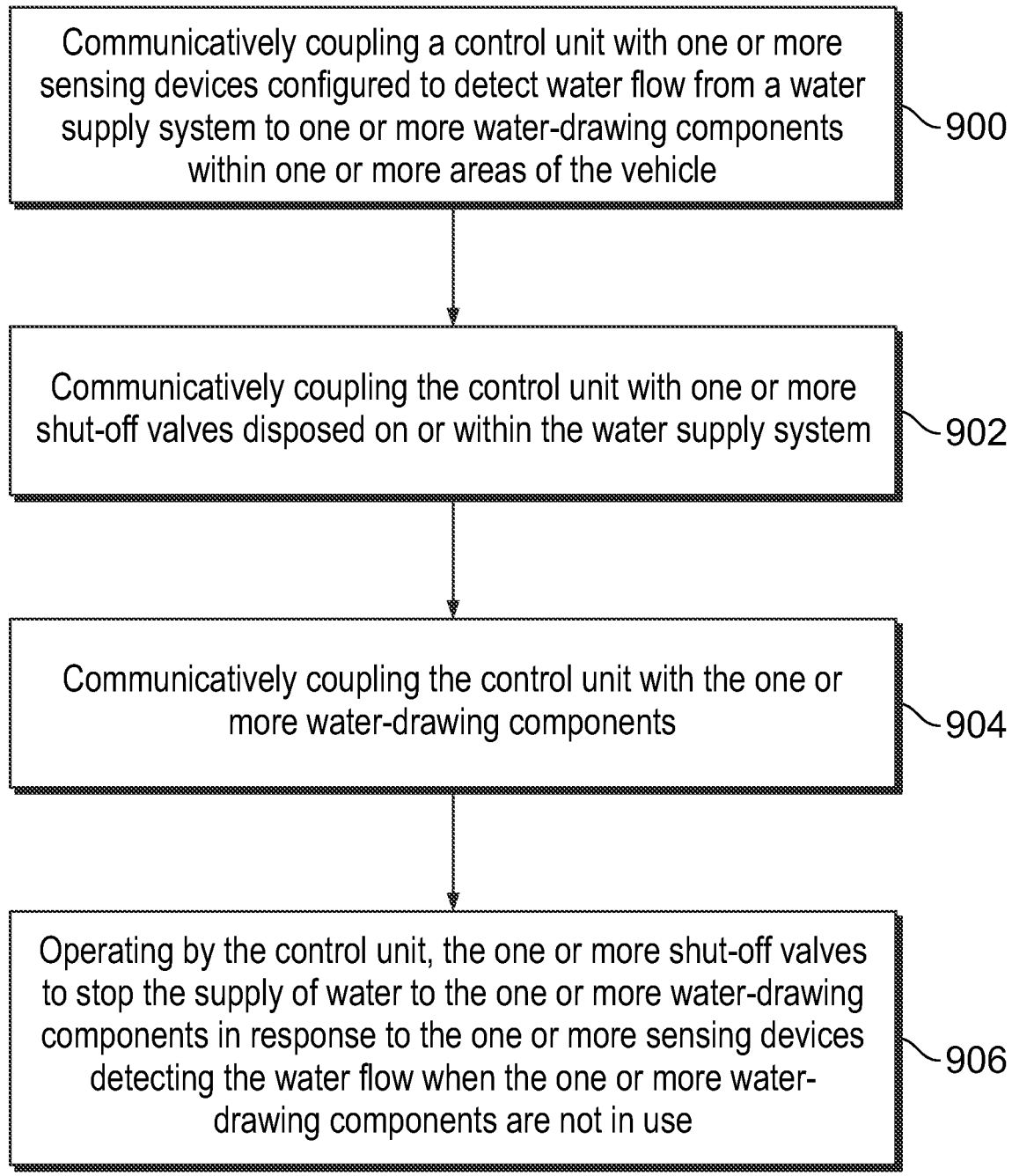
FIG. 15 illustrates a flow chart of a water leak detection method, according to an example of the present disclosure.

FIG. 15 illustrates a flow chart of a water leak detection method, according to an example of the present disclosure. The method includes communicatively coupling, at 900, a control unit with one or more sensing devices configured to detect water flow from a water supply system to one or more water-drawing components within one or more areas of the vehicle. The method also includes communicatively coupling, at 902, the control unit with one or more shut-off valves disposed on or within the water supply system. The method also includes communicatively coupling, at 904, the control unit with the one or more water-drawing components. The method also includes operating, at 906 by the control unit, the one or more shut-off valves to stop the supply of water to the one or more water-drawing components in response to the one or more sensing devices detecting the water flow when the one or more water-drawing components are not in use.

Further, the disclosure comprises examples according to the following clauses:

Clause 1. A vehicle comprising:
an internal cabin;
one or more areas within the internal cabin, wherein the one or more areas include one or more water-drawing components;
a water supply system within the internal cabin, wherein the water supply system is configured to provide water to the one or more water-drawing components; and
a water leak detection system comprising:
one or more sensing devices configured to detect water flow from the water supply system to the one or more water-drawing components;
one or more shut-off valves disposed on or within the water supply system; and
a control unit in communication with the one or more sensing devices, the one or more shut-off valves, and the one or more water-drawing components, wherein the control unit is configured to operate the one or more shut-off valves to stop the supply of water to the one or more water-drawing components in response to the one or more sensing devices detecting the water flow when the one or more water-drawing components are not in use.

Clause 2. The vehicle of Clause 1, wherein the vehicle is an aircraft.

Clause 3. The vehicle of Clauses 1 or 2, wherein the one or more areas comprises one or both of a lavatory or a galley.

Clause 4. The vehicle of any of Clauses 1-3, wherein the one or more water-drawing components comprise one or more of a faucet, a drinking fountain, a shower, a toilet, or a bidet.

Clause 5. The vehicle of any of Clauses 1-4, wherein the one or more shut-off valves comprise an electromechanical solenoid shut-off valve.

Clause 6. The vehicle of any of Clauses 1-5, wherein the water supply system comprises a water tank in fluid communication with a main water supply line, and wherein the main water supply line is in fluid communication with the one or more water-drawing components.

Clause 7. The vehicle of Clause 6, wherein the one or more sensing devices comprise a first sensing device configured to detect the water flow proximate to the water tank, and wherein the one or more shut-off valves comprise a first shut-off valve proximate to the water tank.

Clause 8. The vehicle of Clause 7, wherein the one or more sensing devices further comprise one or more second sensing devices configured to detect the water flow proximate to the one or more water-drawing components, and wherein the one or more shut-off valves comprise one or more second shut-off valves proximate to the one or more water-drawing components.

Clause 9. The vehicle of any of Clauses 1-5, wherein the one or more sensing devices are configured to detect the water flow proximate to the one or more water-drawing components, and wherein the one or more shut-off valves are proximate to the one or more water-drawing components.

Clause 10. The vehicle of any of Clauses 1-9, further comprising a display in communication with the control unit, wherein the control unit is configured to show status indications on the display.

Clause 11. The vehicle of Clause 10 wherein the display includes a status light, wherein the control unit is in communication with the status light, and wherein the status light is on an exterior of a lavatory.

Clause 12. The vehicle of any of Clauses 1-11, wherein the water leak detection system further comprises a user interface in communication with the control unit, and wherein the user interface is configured to be engaged to run a diagnostic test for water leaks.

Clause 13. A method of detecting a water leak within a vehicle, the method comprising:
communicatively coupling a control unit with one or more sensing devices configured to detect water flow from a water supply system to one or more water-drawing components within one or more areas of the vehicle;
communicatively coupling the control unit with one or more shut-off valves disposed on or within the water supply system;
communicatively coupling the control unit with the one or more water-drawing components; and
operating, by the control unit, the one or more shut-off valves to stop the supply of water to the one or more water-drawing components in response to the one or more sensing devices detecting the water flow when the one or more water-drawing components are not in use.

Clause 14. The method of Clause 13, wherein the vehicle is an aircraft, wherein the one or more areas comprises one or both of a lavatory or a galley, and wherein the one or more water-drawing components comprise one or more of a faucet, a drinking fountain, a shower, a toilet, or a bidet.

Clause 15. The method of Clauses 13 or 14, wherein the water supply system comprises a water tank in fluid communication with a main water supply line, and wherein the main water supply line is in fluid communication with the one or more water-drawing components.

Clause 16. The method of Clause 15, wherein the one or more sensing devices comprises a first sensing device configured to detect the water flow proximate to the water tank, and wherein the one or more shut-off valves comprise a first shut-off valve proximate to the water tank.

Clause 17. The method of Clause 16, wherein the one or more sensing devices further comprise one or more second sensing devices configured to detect the water flow proximate to the one or more water-drawing components, and wherein the one or more shut-off valves comprise one or more second shut-off valves proximate to the one or more water-drawing components.

Clause 18. The method of Clauses 13 or 14, wherein the one or more sensing devices are configured to detect the water flow proximate to the one or more water-drawing components, and wherein the one or more shut-off valves are proximate to the one or more water-drawing components.

Clause 19. A water leak detection system for a vehicle, the water leak detection system comprising:
one or more sensing devices configured to detect water flow from a water supply system of the vehicle to one or more water-drawing components within one or more areas of an internal cabin of the vehicle;
one or more shut-off valves disposed on or within the water supply system; and
a control unit in communication with the one or more sensing devices, the one or more shut-off valves, and the one or more water-drawing components, wherein the control unit is configured to operate the one or more shut-off valves to stop the supply of water to the one or more water-drawing components in response to the one or more sensing devices detecting the water flow when the one or more water-drawing components are not in use.

Clause 20. The water leak detection system of claim 19, wherein the one or more sensing devices comprise:
a first sensing device configured to detect the water flow proximate to the water tank, and wherein the one or more shut-off valves comprise a first shut-off valve proximate to the water tank; and
one or more second sensing devices configured to detect the water flow proximate to the one or more water-drawing components, and wherein the one or more shut-off valves comprise one or more second shut-off valves proximate to the one or more water-drawing components.

As described herein, examples of the present disclosure provide systems and methods for effectively detecting water leaks within an internal cabin of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
one or more water-drawing components;
a water supply system configured to provide water to the one or more water-drawing components; and
a water leak detection system comprising:
one or more sensing devices;
one or more shut-off valves; and
a control unit in communication with the one or more sensing devices, the one or more shut-off valves, and the one or more water-drawing components, wherein the control unit is configured to operate the one or more shut-off valves to stop a supply of water to the one or more water-drawing components in response to the one or more sensing devices detecting water flow when the one or more water-drawing components are not in use.

2. The vehicle of claim 1, wherein the vehicle is an aircraft.

3. The vehicle of claim 1, wherein the one or more water-drawing components are in one or both of a lavatory or a galley.

4. The vehicle of claim 1, wherein the one or more water-drawing components comprise one or more of a faucet, a drinking fountain, a shower, a toilet, or a bidet.

5. The vehicle of claim 1, wherein the one or more shut-off valves comprise an electromechanical solenoid shut-off valve.

6. The vehicle of claim 1, wherein the water supply system comprises a water tank in fluid communication with a main water supply line, and wherein the main water supply line is in fluid communication with the one or more water-drawing components.

7. The vehicle of claim 6, wherein the one or more sensing devices comprise a first sensing device configured to detect the water flow proximate to the water tank, and wherein the one or more shut-off valves comprise a first shut-off valve proximate to the water tank.

8. The vehicle of claim 7, wherein the one or more sensing devices further comprise one or more second sensing devices configured to detect the water flow proximate to the one or more water-drawing components, and wherein the one or more shut-off valves comprise one or more second shut-off valves proximate to the one or more water-drawing components.

9. The vehicle of claim 1, wherein the one or more sensing devices are configured to detect the water flow proximate to the one or more water-drawing components, and wherein the one or more shut-off valves are proximate to the one or more water-drawing components.

10. The vehicle of claim 1, further comprising a display in communication with the control unit, wherein the control unit is configured to show status indications on the display.

11. The vehicle of claim 10 wherein the display includes a status light, wherein the control unit is in communication with the status light, and wherein the status light is on an exterior of a lavatory.

12. The vehicle of claim 1, wherein the water leak detection system further comprises a user interface in communication with the control unit, and wherein the user interface is configured to be engaged to run a diagnostic test for water leaks.

13. A method comprising:
communicatively coupling a control unit with one or more sensing devices;
communicatively coupling the control unit with one or more shut-off valves;
communicatively coupling the control unit with one or more water-drawing components; and
operating, by the control unit, the one or more shut-off valves to stop a supply of water to the one or more water-drawing components in response to the one or more sensing devices detecting water flow when the one or more water-drawing components are not in use.

14. The method of claim 13, wherein the one or more water-drawing components comprise one or more of a faucet, a drinking fountain, a shower, a toilet, or a bidet.

15. The method of claim 13, wherein a water supply system comprises a water tank in fluid communication with a main water supply line, and wherein the main water supply line is in fluid communication with the one or more water-drawing components.

16. The method of claim 15, wherein the one or more sensing devices comprises a first sensing device configured to detect the water flow proximate to the water tank, and wherein the one or more shut-off valves comprise a first shut-off valve proximate to the water tank.

17. The method of claim 16, wherein the one or more sensing devices further comprise one or more second sensing devices configured to detect the water flow proximate to the one or more water-drawing components, and wherein the one or more shut-off valves comprise one or more second shut-off valves proximate to the one or more water-drawing components.

18. The method of claim 13, wherein the one or more sensing devices are configured to detect the water flow proximate to the one or more water-drawing components, and wherein the one or more shut-off valves are proximate to the one or more water-drawing components.

19. A water leak detection system for a vehicle, the water leak detection system comprising:
a control unit in communication with one or more sensing devices, one or more shut-off valves, and one or more water-drawing components,
wherein the control unit is configured to operate the one or more shut-off valves to stop a supply of water to the one or more water-drawing components in response to the one or more sensing devices detecting water flow when the one or more water-drawing components are not in use.

20. The water leak detection system of claim 19, wherein the one or more sensing devices comprise:
a first sensing device configured to detect the water flow proximate to a water tank, and wherein the one or more shut-off valves comprise a first shut-off valve proximate to the water tank; and
one or more second sensing devices configured to detect the water flow proximate to the one or more water-drawing components, and wherein the one or more shut-off valves comprise one or more second shut-off valves proximate to the one or more water-drawing components.

* * * * *